United States Patent [19]

Mehrotra et al.

[11] Patent Number: 4,965,231
[45] Date of Patent: * Oct. 23, 1990

[54] ALUMINA-ZIRCONIA-SILICON CARBIDE-MAGNESIA COMPOSITIONS AND ARTICLES MADE THEREFROM

[75] Inventors: Pankaj K. Mehrotra; Elizabeth R. Billman, both of Greensburg, Pa.

[73] Assignee: Kennametal Inc., Latrode, Pa.

[*] Notice: The portion of the term of this patent subsequent to Sep. 25, 2007 has been disclaimed.

[21] Appl. No.: 266,735

[22] Filed: Nov. 3, 1988

[51] Int. Cl.$^5$ ............................................. C04B 35/56
[52] U.S. Cl. ........................................ 501/89; 51/309
[58] Field of Search ........................... 501/89; 51/309; 407/119; 408/144

[56] References Cited

U.S. PATENT DOCUMENTS

| | | | |
|---|---|---|---|
| 4,218,253 | 8/1980 | Dworak et al. | 106/43 |
| 4,292,049 | 9/1981 | Tanaka et al. | 51/309 |
| 4,298,385 | 11/1981 | Claussen et al. | 501/105 |
| 4,316,964 | 2/1982 | Lanse | 501/105 |
| 4,331,048 | 5/1982 | Dworak et al. | 82/1 |
| 4,366,254 | 12/1982 | Rich et al. | 501/89 |
| 4,419,311 | 12/1983 | Claussen et al. | 264/60 |
| 4,421,861 | 12/1983 | Claussen et al. | 501/103 |
| 4,506,024 | 3/1985 | Claussen et al. | 501/105 |
| 4,507,224 | 3/1985 | Toibana et al. | 252/516 |
| 4,543,343 | 9/1985 | Iyori et al. | 501/87 |
| 4,543,345 | 9/1985 | Wel et al. | 501/95 |
| 4,657,877 | 4/1987 | Becher et al. | 501/89 |
| 4,745,091 | 5/1988 | Landingham | 501/87 |
| 4,746,635 | 5/1988 | Inoue et al. | 501/89 |
| 4,749,667 | 6/1988 | Jun et al. | 501/89 |
| 4,767,727 | 8/1988 | Claussen et al. | 501/87 |
| 4,770,673 | 9/1988 | Ketcham et al. | 51/309 |
| 4,789,277 | 12/1988 | Rhodes et al. | 409/131 |
| 4,801,510 | 1/1989 | Mehrotra et al. | 428/698 |
| 4,820,663 | 4/1989 | Mehrotra et al. | 501/87 |
| 4,849,381 | 7/1989 | Brandt et al. | 501/89 |
| 4,852,999 | 8/1989 | Mehrotra et al. | 51/309 |
| 4,867,761 | 9/1989 | Brandt et al. | 51/309 |

FOREIGN PATENT DOCUMENTS

| | | |
|---|---|---|
| 0194811 | 9/1986 | European Pat. Off. . |
| 0202504 | 11/1986 | European Pat. Off. . |
| 0208910 | 1/1987 | European Pat. Off. . |
| 0252046 | 1/1988 | European Pat. Off. . |
| 62-265182 | 11/1987 | Japan . |
| 63-30378 | 2/1988 | Japan . |
| 86/05480 | 9/1986 | PCT Int'l Appl. . |

OTHER PUBLICATIONS

Buljan, S. T. et al., "Ceramic Whisker-and Particulate-Composites: Properties, Reliability, and Applications", Ceramic Bulletin, vol. 68, No. 2 (1989), pp. 387-394.

"Feldmuehle SPK Tools Fast & Safe," advertisement (9/1981).

Gruss, W. W., "Turning of Steel with Ceramic Cutting Tools," Tool Materials for High Speed Machining, (proceedings held Feb. 25-27, 1987, Scottsdale, Az.), (1987), pp. 105-115.

Whitney, E. D. et al., "Engineered Ceramics for High Speed Machining," (proceedings Feb. 25-27, 1987, Scottsdale, Az.) (1987), pp. 77-82.

Stevens, "An Introduction to Zirconia-Zirconia and Zirconia Ceramics," Magnesium Elektron Ltd., (1986).

"Multitoughening Ceramic," Techno Japan, vol. 19, No. 10, Oct. 1986.

"60 Year Old Grows Whiskers," Metal Powder Report, Jul. 1986.

(List continued on next page.)

Primary Examiner—William R. Dixon, Jr.
Assistant Examiner—Deborah Jones
Attorney, Agent, or Firm—John J. Prizzi

[57] ABSTRACT

An alumina based ceramic composition is provided containing (in volume percent, v/o): about 1.5 to 17.5 silicon carbide whiskers; about 5 to 17.5 zirconia; residue of a magnesium oxide addition added in an amount of about 0.03 to 3; and an alumina based matrix in which the silicon carbide whiskers, zirconia and residue of magnesium oxide are substantially homogeneously distributed. At least 4 v/o of the alumina based ceramic composition is tetragonal zirconia.

28 Claims, 1 Drawing Sheet

OTHER PUBLICATIONS

E. L. Exner et al., "SiC Whisker Reinforced Al$_2$O$_3$ZrO$_2$ Composites," Ceram. Eng. Sci. Proc., 9 [7-8], pp. 597-602 (1988).

Clausen et al., "Whisker Reinforced Oxide Ceramics," Journal de Physique Colloque Cl, Supplement No. 2, tome 47, Feb. 1986, pp. CL-693 to CL-702.

Grewe et al., "Whisker Reinforced Ceramics," Ceramic Forum Int'l, Aug./Sep. 1987, pp. 303-317.

Becher et al., "Toughening of Ceramics by Whisker Reinforcement," Fracture Mechanics & Ceramics, (proceedings of Conf. held 6-19-21, 1985, Va.), ed. by Bradt et al., Plenum Press, N.Y. (1986), pp. 61-73.

Porter et al., "Microstructural Development in MgO—Partially Stabilized Zirconia (Mg-PS2)," Journal of Am. Ceramic Society, vol. 62, No. 5-6, May-Jun. 1979, pp. 298-305.

Clausen, "Fracture Toughness of Al$_2$O$_3$ with an Unstabilized ZrO$_2$ Dispersed Phase," Journal of the American Society, vol. 59(1-2), pp. 49-51.

Japan Ceramic News, vol. 1, No. 10 (12/10/87), pp. 1,2.

American National Standard for Cutting Tools, Ansi B212.4-1986.

Metal Working News, Oct. 3, 1988, "Greenleaf Makes Ceramic Cutting Insert."

N. Claussen, "Stress Induced Transformation of Tetragonal ZrO$_2$ Particles in Ceramic Matrices," Am. Cer. Soc. Journal, vol. 61, No. 1-2 (1978), pp. 85,86.

"Phase Diagrams for Ceramists," Amer. Cer. Soc. (1975 Supp), pp. 117, 163E, 166.

Claussen et al., "Phase Transformations of Solid Solutions of ZrO, & HfO$_2$ in AN Al$_2$O$_3$ Matrix," Sci. & Tech. of Zirconia, Advances in Ceramics, vol. 3, Eds. A. H. Heuer & L. W. Hobbs, Am. Cer. Soc. (1981), pp. 164-166.

Tien et al., "Toughened Ceramics in the System Al$_2$O$_3$: Cr$_2$O$_3$l2rO$_2$: HfO$_2$" Int. J. High Tech. Ceramics 2 (1986), pp. 207-219.

E. R. Billman et al., "Machining with Al$_2$O$_3$-SiC-Whisker Cutting Tools," Ceramic Society Bulletin, vol. 67, No. 6, 1988, pp. 1016-1019.

Becher et al., "Transformation Toughened and Whisker Reinforced Ceramics," Soc. of Automotive Engineers, Proc. 21st Auto. Techn. Dev. Meeting, Mar. 1984, pp. 201-205.

ALUMINA-ZIRCONIA-SILICON CARBIDE-MAGNESIA COMPOSITIONS AND ARTICLES MADE THEREFROM

BACKGROUND OF THE INVENTION

The present invention relates to alumina based ceramic compositions containing zirconia and silicon carbide. It especially relates to ceramic articles useful in high temperature (600° C. to 1200° C.) wear applications.

In the past, zirconia has been added in specified amounts to selected alumina-silicon carbide whisker reinforced compositions described in U.S. Pat. Nos. 4,534,345 and 4,507,224 to provide enhanced fracture toughness and/or flexural strength (see: U.S. Pat. Nos. 4,657,877 and 4,749,667; Japanese Patent Publication No. Sho 62-265182; Clausen et al, "Whisker-Reinforced Oxide Ceramics," Journal de Physique Colloque Cl, Supplement au No. 2, Tome 47, February 1986, Pages Cl-693 to Cl-702; Becher et al, "Toughening of Ceramics by Whisker Reinforcement," Fracture Mechanics of Ceramics 7, ed. by Bradt et al, Plenum Press, New York (1986), Pages 61–73).

It has been indicated that the zirconia should be in the monoclinic and/or (metastable) tetragonal phase to obtain improved fracture toughness and/or flexural strength. It has been further indicated that the metastable tetragonal phase is obtained by reducing zirconia particle size or through the use of a cubic zirconia stabilization promoter such as yttria, calcia, magnesia and the rare earth oxides in amounts below that required to fully stabilize the cubic zirconia phase.

Cutting tools composed of a variety of compositions containing alumina, zirconia and silicon carbide whiskers with or without other additives have been proposed (see: European Patent Application No. 86107916.8 (published Jan. 21, 1987 as No. 0208910); U.S. Pat. No. 4,749,667; "Multitoughening Ceramic," Techno Japan, Vol. 19, No. 10, October 1986, Page 78; and European Patent Application No. 86301597.0, published Sept. 17, 1986, as No. 0194811).

Where an indication is given as to the material being cut by these tools, these tools have been applied to the machining of cast irons, hardened steels and nickel based superalloys. These are all materials that have relatively low reactivity with the silicon carbide in the cutting insert at the high temperatures encountered during metalcutting. None of the foregoing documents teaches or suggests that, for metalcutting inserts for use in the high speed roughing of soft steels, cutting performance can be significantly improved by controlling the alumina based ceramic composition to within the combination of critical ranges now discovered by the applicants for zirconia, magnesia, silicon carbide and tetragonal zirconia contents.

SUMMARY OF THE INVENTION

Applicants have surprisingly discovered that alumina based ceramic compositions containing (in volume percent, v/o) about 1.5 to 17.5 v/o silicon carbide whiskers, about 5 to 17.5 v/o zirconia, the residue of a magnesium oxide or other magnesium-oxygen compound addition, and at least 4 v/o tetragonal zirconia, have excellent high temperature wear properties as indicated by excellent cutting edge lifetimes when engaged in the high speed rough machining of soft steel. It has been surprisingly found that, despite the finding that minor magnesia additions act to reduce the amount of tetragonal (i.e., metastable tetragonal) zirconia at room temperature, an effective amount of this addition has a significant positive affect on cutting edge lifetime in the high speed rough turning of soft steels, such as AISI (American Iron and Steel Institute) 1045 steel.

In accordance with the present invention, it has been surprisingly found that the magnesia addition can be added to the present composition in amounts effective to preferably provide the cutting edge with a lifetime of at least 12 minutes when turning AISI 1045 steel, having a Brinell hardness number in the range of 190 to 200, under the conditions of 1000 surface feet/minute, 0.025 inch/revolution and 0.100 inch depth of cut. These magnesia additions, more preferably, can produce cutting edge lifetimes of at least 15, and most preferably, of at least 20 minutes. It is preferred that magnesia be added in amounts of about 0.03 to 3 v/o; more preferably, about 0.03 to 2.0 v/o; and most preferably, about 0.04 to 1.0 v/o.

Preferably, the alumina based ceramic composition according to the present invention contains about 2.5 to 15 v/o and, more preferably, about 2.5 to 10.5 v/o silicon carbide whiskers.

The zirconia content according to the present invention is preferably 7.5 to 17.5 v/o and, more preferably, about 10 to 15 v/o. In accordance with the present invention, a significant fraction of the zirconia (preferably at least 22 volume percent) is in the form of tetragonal zirconia and must form at least 4 v/o of the composition. Preferably, at least 6 v/o; more preferably, at least 7 v/o; and most preferably, at least 8 v/o of the composition is in the form of tetragonal zirconia.

These and other aspects of the present invention will become more apparent upon review of the detailed description of the present invention in conjunction with the figures briefly described below:

DETAILED DESCRIPTION OF THE INVENTION

Figure 1:
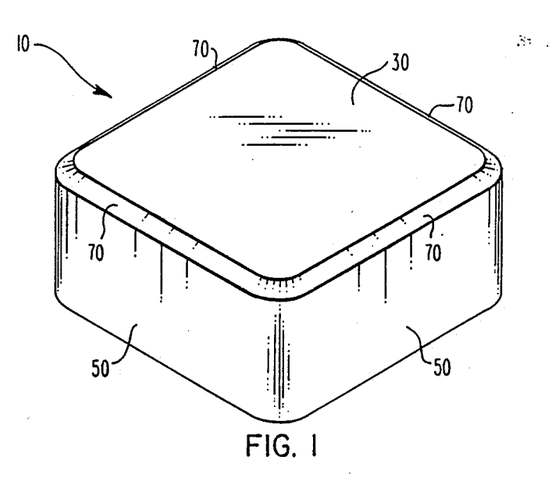
FIG. 1 is an isometric view of an embodiment of a square cutting insert in accordance with the present invention.

In a preferred embodiment of the present invention, as shown in FIG. 1, a metalcutting insert 10, preferably of the indexable type, is provided having a rake face 30, a flank face 50 and cutting edge 70 at the juncture of the rake and the flank faces. The cutting edge 70 is preferably in a chamfered condition (e.g., K-land) as shown in FIG. 1. The metalcutting insert is composed of an alumina based ceramic composition containing: about 1.5 to 17.5 v/o silicon carbide whiskers; about 5 to 17.5 v/o zirconia; and a residue of a magnesium oxide or other magnesium-oxygen compound addition added in an amount effective to enhance the metalcutting lifetime of the cutting edge when engaged in the high speed rough turning of a soft iron base alloy, such as AISI 1045 steel having a hardness of about 190 to 200 BHN (Brinell Hardness Number). The silicon carbide whiskers zirconia and residue of magnesia are substantially homogeneously distributed in an alumina based matrix.

The silicon carbide whiskers are present at a level of at least about 1.5 v/o to assure minimal levels of cutting edge lifetime improvement. More preferably, silicon carbide whiskers are present at about 2.5 v/o or more. The silicon carbide whisker content preferably should not exceed about 17.5 v/o of the composition. We believe that silicon carbide whisker contents above this value result in a significant decrease in the cutting edge lifetime during the high speed rough turning of soft steels. Therefore, to further maximize cutting edge lifetime during high speed roughing of steels, such as AISI 1045, it is preferred that the maximum content of silicon carbide whiskers be held at or below about 15 v/o and, more preferably, at or below about 10.5 v/o of the alumina based ceramic composition.

The silicon carbide whiskers utilized herein may be any of the commercially available brands which have been used in the past in alumina based metalcutting inserts for machining nickel base superalloys.

While less preferred, silicon carbide particles of a generally equiaxed shape or platelet shape may be substituted for part of the silicon carbide whiskers in this invention.

The zirconia content is in the range of about 5 to 17.5 v/o of the ceramic composition. Zirconia contents outside of this range are believed to provide compositions having reduced cutting edge lifetime during the high speed roughing of AISI 1045 steel. Preferably, to maximize cutting edge lifetime, the zirconia content should be within the range of about 7.5 to 17.5 v/o and, more preferably, about 10 to 15 v/o of the composition. While we believe that the concentration of tetragonal zirconia should be maximized for best cutting performance, it is equally, if not more, important in our opinion that as much of the tetragonal zirconia as possible, present at room temperature, be available for transformation toughening at, or as near as possible to, the temperatures encountered at the cutting edge during machining. It is, therefore, critical to the present inVention that magnesia be present in certain small, but effective, amounts which have been found critical to the maximization of cutting edge lifetime. In accordance with the present invention, at least about 22 volume percent of the zirconia present, and at least 4 v/o of the ceramic composition, must be tetragonal zirconia. Preferably, the tetragonal zirconia forms at least about 6 v/o of the composition, more preferably, at least about 7 v/o of the composition, and most preferably, at least about 8.0 v/o of the composition.

Magnesia additions, despite the fact that they decrease the amount of tetragonal zirconia observed at room temperature, are preferably added in the range of about 0.03 to 3 v/o of the composition, more preferably, about 0.03 to 2 v/o; most preferably, about 0.04 to 1.0 v/o. Magnesia may be blended in with the alumina or zirconia just prior to compact pressing, or it may be preblended or prealloyed with the alumina or zirconia. Preblending of the magnesia powder is preferred since it is believed that the preblended magnesia is more effective in producing high temperature metastable tetragonal zirconia, thus allowing a smaller amount of magnesia to be added and minimizing the deleterious effects of high magnesia additions (e.g., lower melting point glass and Mg-Al-0 formations). Equivalent amounts of other magnesium-oxygen compounds, such as magnesium carbonate, which may require an additional processing step such as calcination to produce magnesia may be substituted for all or part of the magnesia addition. After sintering of the blended compositions, the magnesia addition may not exist as a separate phase but as a residue. This residue may include, for example, magnesia-alumina solid solution, magnesium aluminate, a magnesia zirconia solid solution and/or a glass, for example, formed with silicon dioxide impurities which may have existed as a thin coating on the silicon carbide whiskers.

The remainder of the ceramic composition is essentially alumina and preferably entirely alumina except for impurities. In all cases, the present alumina based ceramic composition contains at least 40 v/o alumina and, preferably, at least about 50 v/o alumina.

Titanium carbide, as whiskers and/or substantially equiaxial particulate, may be added in an amount of about 2 to 35 v/o of the composition and, preferably of about 10 to 30 v/o. Titanium carbide has a higher thermal expansion coefficient than alumina. It is, therefore, believed that titanium carbide additions should allow more tetragonal zirconia to be retained at room temperature. Titanium carbide whiskers may be manufactured and harvested by the methods described in A. Kato et al, "Growth Rate of Titanium Carbide Whiskers in Chemical Vapor Deposition," *J. Cryst. Growth.* 37 (1977), Pages 293–300; and N. Tamari et al, "Catalytic Effects of Various Metals and Refractory Oxides on the Growth of TiC Whiskers by Chemical Vapor Deposition," *J. Cryst. Growth*, 46 (1979), pages 221–237. Titanium carbide whiskers and their incorporation and use in alumina based cutting inserts are disclosed in Mehrotra et al U.S. Patent Application Ser. No. 056,091, filed May 28, 1987, and assigned to Kennametal Inc. now U.S. Pat. No. 4,852,999.

The alumina powders utilized herein should be high purity alumina (i.e., >99% pure) such as produced by ALCOA (e.g., grade A16SG), by Ceralox (e.g., grade HPA - 0.5 with or without magnesia) or by Reynolds Chemicals (grade RC-HP or RC-HP-DBM).

Yttria, calcia, the rare earth oxides, and other compounds which have, through a reduction in the tetragonal to monoclinic transformation temperature, an adverse affect on cutting edge lifetime are preferably present only as impurities, if present at all.

The foregoing material, in accordance with the present invention, may be milled, blended, and densified at high temperature to produce at least 98%, and preferably, at least 99% dense alumina based ceramic compositions having an alumina based matrix, which is preferably entirely alumina, in which the silicon carbide, magnesia residue from the magnesia addition, zirconia and titanium carbide, if any, are at least substantially homogeneously distributed. Hot pressing or sintering temperatures are preferably held below 1700° C., and more preferably, below 1650° C. and, most preferably, below about 1600° C. to minimize zirconia particle growth and thereby maximize the tetragonal zirconia phase present in the final product. The average zirconia particle size in the cutting insert should not exceed about 5 microns, preferably should not exceed 2 microns, and more preferably, should not exceed 1 micron. However, the average zirconia particle size should be large enough to allow most tetragonal zirconia to transform to monoclinic zirconia during use. This minimum size will depend upon the ceramic composition and is presently undetermined.

Preferably, the material in accordance with the present invention has a Rockwell A hardness of at least 93 and a $K_{IC}$ (E & C) toughness of at least about 5MPam$^{\frac{1}{2}}$.

While not wishing to be bound by any particular theory, applicants offer the following explanation of the present invention. In alumina-silicon carbide whisker-zirconia compositions, the amount of metastable tetragonal zirconia that can be obtained at room temperature can be increased by a reduction in zirconia particle size or the addition of the so-called cubic stabilizing agents, such as yttria, calcia and/or the rare earth oxides. (see: Stevens, "An Introduction to Zirconia--Zirconia and Zirconia Ceramics," Magnesium Elektron Pub. No. 113, Magnesium Elektron Ltd., England (1986)). While the literature commonly includes magnesia among the foregoing list of stabilizing agents, applicants have found that, when magnesia is added in the amount of about 0.03 to 3 v/o to the present compositions, magnesia decreases the amount of tetragonal zirconia present at room temperature. When yttria is added to zirconia, it tends to stabilize the tetragonal and cubic phases of zirconia to a lower temperature. All the aforementioned stabilizing agents, and most impurities, except for magnesia, affect $ZrO_2$ in similar ways (i.e., they reduce the temperature at which the tetragonal zirconia phase is stable). At room temperature, some of the zirconia may be present as metastable tetragonal zirconia. Under the action of tensile stress, this tetragonal zirconia may become monoclinic, giving rise to transformation toughening. However, as the temperature increases, tetragonal zirconia becomes stable and, therefore, unavailable for transformation to the monoclinic crystal structure. Thus, any impurity or additive, such as yttria, which stabilizes tetragonal zirconia at lower temperatures, is unsuitable for metalcutting applications since the cutting tip temperature may rise to 1000°to 1200° C. in high speed machining. Therefore, in accordance with the theory of the present invention, additives which raise the monoclinic to tetragonal transformation temperature of the zirconia are required for high temperature transformation toughening. We have found that there are only two oxide additives, MgO and $HfO_2$, which raise the transformation temperature. Thus, we believe that by keeping the zirconia particle size small, a large proportion of the zirconia can be retained as metastable tetragonal zirconia at the high temperature of metalcutting by allowing the zirconia with magnesia or hafnia. It is our belief that this helps to obtain enhanced tool lives in metalcutting operations. It should be noted that zirconia normally contains up to about 2 w/o (weight percent) hafnia as an impurity.

The significant positive impact that magnesia additions have on metalcutting performance is more clearly indicated by the following examples which are purely illustrative of the present invention.

Six compositions were prepared (Table 1) with the nominal compositions being $Al_2O_3$ - 10 v/o $SiC_w$ (silicon carbide whiskers) - 10 v/o $ZrO_2$. Small additions of $Y_2O_3$ and MgO were made. In the case of Mix No. 6, about 0.05 w/o (approximately 0.06 v/o) MgO had already been blended with $Al_2O_3$ by the powder manufacturer. This provided Mix No. 6 with a magnesia content of about 0.04 v/o. Fifty gram batches of these powders were prepared by first blending $Al_2O_3$ and $ZrO_2$ (and stabilizing additives, if any) slurries (propanol) in a jar mill using $Al_2O_3$ cycloids for one hour. Sonicated $SiC_w$ slurry was then added, and the whole mix was blended for one hour. $Al_2O_3$ and $ZrO_2$ slurries had previously been milled to obtain mean particle sizes of 0.5 to 0.6 $\mu$m and 0.6 to 0.8 $\mu$m, respectively (corresponding specific surface areas measured by BET were 10 to 14 $m^2/g$ and 20 to 40 $m^2/g$, respectively). Then, the mix was pan dried, screened through 100 mesh screen, and hot pressed in a one inch diameter graphite die at the temperatures and pressures shown below in Table 1 for one hour in argon. The resulting billets were more than 99% dense, and were cut, ground and polished for measurement of physical and mechanical properties. The billets were also cut and ground to produce indexable cutting inserts for metalcutting tests.

TABLE 1
COMPOSITIONS

Nominal Composition: $Al_2O_3$ - 10 v/o $SiC_w$ - 10 v/o $ZrO_2$

| | |
|---|---|
| $Al_2O_3$ | Alcoa A16SG |
| $SiC_w$ | Tokai Carbon Co. (Tokyo, Japan) TOKAWHISKER (TOKAMAX) Grade 1 (0.3–1.0 $\mu$m diameter; 20–50 $\mu$m length) |
| $ZrO_2$ | Zircar - unstabilized |
| MgO | Fisher Scientific Corp. - Reagent Grade BET = 40.4 $m^2/g$ |
| $Y_2O_3$ | MolyCorp, BET = 15.4 $m^2/g$ |

Hot Pressing

| Mix No. | Temp.(°C.) | Pressure (psi) | Composition |
|---|---|---|---|
| 1. | 1650 | 4000 | Nominal |
| 2. | 1650 | 4500 | Nominal + 1 v/o $Y_2O_3$ |
| 3. | 1625 | 4500 | Nominal + 1 v/o MgO |
| 4. | 1600 | 4500 | Nominal + 1 V/o $Y_2O_3$ + 1 v/o MgO |
| 5. | 1625 | 4500 | Nominal, except that $Al_2O_3$ used was Ceralox Grade HPA - 0.5 (0.5 to 0.7 $\mu$m median particle size) |
| 6. | 1625 | 4500 | Nominal, except that $Al_2O_3$ used was Ceralox Grade HPA - 0.5 with MgO (0.05 w/o) |

TABLE 2
PROPERTIES

| | | | Tetragonal $ZrO_2$[2] | |
|---|---|---|---|---|
| Mix No. | RA Hardness | Fracture Toughness $K_{IC}$ (E&C)[1] (MPa $m^{\frac{1}{2}}$) | as v/o of $ZrO_2$ | as v/o of Composite |
| 1 | 93.3 | 5.59 | 84 | 8.4 |
| 2 | 93.3 | 4.97 | 100 | 10 |
| 3 | 93.6 | 5.96 | 70 | 7 |
| 4 | 93.6 | 4.63 | 98 | 9.8 |
| 5 | 93.9 | 5.88 | 84 | 8.4 |
| 6 | 93.8 | 5.88 | 76 | 7.6 |

[1]Evans and Charles, "Fracture Toughness Determination by Indentation," J. American Ceramic Society, Vol. 59, No. 7-8, Pages 371, 372, using an 18.5 kg load.
[2]As measured by x-ray diffraction of a polished surface. The remainder of the zirconia is assumed to be monoclinic zirconia. Cubic zirconia, which may be present in minor amounts, is included within the tetragonal zirconia estimate.

Physical and mechanical properties of the hot pressed composites are shown in Table 2.

The Porter-Heuer (Porter et al, J. American Ceramic Society, Vol. 62, No. 5-6 (1979), pages 298–305) formula was modified and used to estimate the fraction of monoclinic $ZrO_2$ (Vm) from peak intensities of the $\bar{1}11$ reflection of the monoclinic $ZrO_2$ (Im($\bar{1}11$)), and 111 reflection of the tetragonal $ZrO_2$ (It(111)):

$$Vm = \frac{1.603\ Im\ (111)}{1.603\ Im\ (111) + It\ (111)} \quad (1)$$

and $$Vt = 1 - Vm \quad (2)$$

where $V_t$ is the fraction of $ZrO_2$ which is tetragonal $ZrO_2$.

The estimated volume fraction of tetragonal $ZrO_2$ in the whole composite is ($v_t$):

$$v_t = V_t v_z \qquad (3)$$

where $v_z$ is the volume fraction of the total $ZrO_2$ added in the mix. The above relationship assumes that $ZrO_2$ substantially remains unchanged during consolidation except for the phase transformations discussed above.

Figure 2:
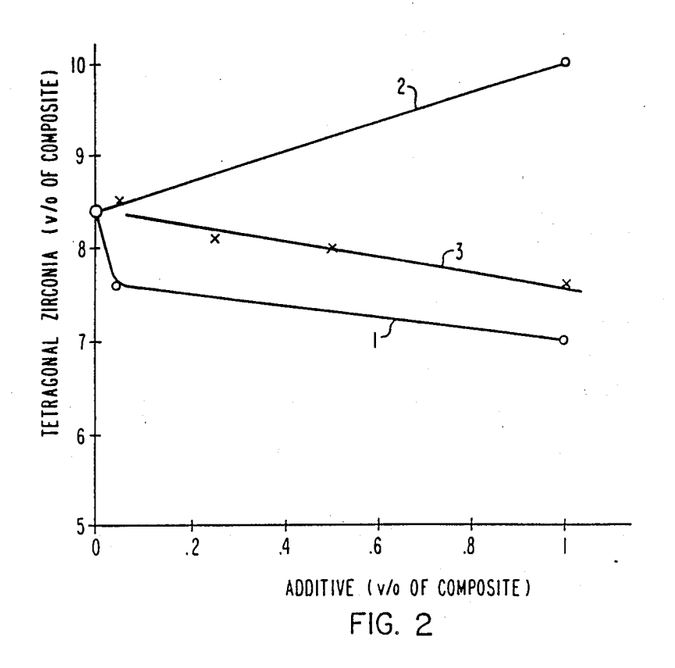
FIG. 2 shows a graph of the volume percent tetragonal zirconia in the composite as a function of the volume percent of magnesia, or yttria, addition.

FIG. 2 shows the effect of the various additives on the amount of tetragonal zirconia in the composites. It can clearly be seen that magnesia additions lower the amount of tetragonal zirconia (curve 1), whereas, yttria additions increase the amount of tetragonal zirconia at room temperature (curve 2).

TABLE 3

TURNING AISI 1045* STEEL (192-200 BHN)

| Insert Material | Cutting Edge Life & Failure Mode | | Average Life (minutes) |
|---|---|---|---|
| Mix 1 | 14. BK | 14.7 BK | 14.4 |
| Mix 2 | 8. BK | 12.6 BK | 10.3 |
| Mix 3 | 15.9 BK | 29.2 FW | 22.6 |
| Mix 4 | 1.7 FW | 7.7 FW | 4.7 |
| Mix 5 | 17. FW | 7.5 BK | 12.3 |
| Mix 6 | 22.9 DN | 32.9 FW | 27.9 |

Test Conditions:
1000 sfm (surface feet/minute)
0.025 ipr (inch/revolution)
0.100 inch doc (depth of cut)
SNGN-453T (American National Standard
Designation in accordance with ANSI B212.4 - 1986) indexable cutting insert style
(cutting edge preparation:
0.008 inch × 20° K-land)
15° lead angle (side cutting edge angle)
−5° side rake angle
−5° back rake angle
no coolant
Cutting Edge Life Criteria:
FW - .015" uniform flank wear
MW - .030" concentrated flank wear
CR - .004" crater wear
DN - .030" depth of cut notch
CH - .030" concentrated wear or chipping
BK - breakage
*AISI 1045 is equivalent to Unified Numbering System (UNS) Designation - G10450.

Indexable insert cutting edge lifetimes in the high speed roughening of a premachined AISI 1045 steel are shown in Table 3. It can be clearly seen that a significant improvement in cutting edge lifetime is achieved by the addition of magnesia, whereas, a decrease in tool life occurs when yttria is added despite the high level of tetragonal zirconia present in the yttria containing compositions.

TABLE 4

COMPOSITIONS

Nominal Composition: $Al_2O_3$ - 5 v/o $SiC_w$ - 10 v/o $ZrO_2$

| $Al_2O_3$ | Ceralox - HPA - .5 without MgO |
| $SiC_w$ | Tokai Grade 1 |
| $ZrO_2$ | Magnesium Elektron (SC15) - unstabilized (.5–.6 μm particle size BET 5-8 m²/g) |

| Mix No. | Hot Pressing Temp. °C. | Pressure(psi) | Composition |
|---|---|---|---|
| 7 | 1535° C. | 5000 psi | Nominal + .05 v/o MgO |
| 8 | 1550° C. | 5000 psi | Nominal + .25 v/o MgO |
| 9 | 1550° C. | 5000 psi | Nominal + .50 v/o MgO |
| 10 | 1550° C. | 5000 psi | Nominal + 1.0 v/o MgO |

TABLE 4-continued

COMPOSITIONS

| 11 | 1550° C. | 5000 psi | Nominal + 3.0 v/o MgO |

A second series of mixes, 7 to 11 shown in Table 4, were made to further demonstrate the effect that the level of the magnesia has on tetragonal zirconia content and cutting edge lifetime. All samples were processed and hot pressed essentially as described with respect to the samples produced from Mixes 1 to 6.

The physical and mechanical properties of the materials are reported in Table 5. It can clearly be seen that the tetragonal zirconia content again clearly decreases with increasing amounts of magnesia addition. This affect is also shown in FIG. 1, curve 3. It can be seen that Mixes 7 to 11 have a higher tetragonal zirconia content than that found in the materials represented by curve 1. The affect is believed to be due to the lower $SiC_w$ content (5 v/o versus 10 v/o) used in the second group of mixes. Applicants have observed that generally, as SiC whisker content increases, the amount of tetragonal zirconia decreases for a given zirconia content, and everything else being held constant.

TABLE 5

PROPERTIES

| Mix No. | V/o MgO | RA Hardness | Fracture Toughness $K_{IC}$ (E&C) (MPa m$^{\frac{1}{2}}$) | Tetragonal $ZrO_2$ as v/o of Composite |
|---|---|---|---|---|
| 7 | 0.05 | 93.5 | 5.57 | 8.5 |
| 8 | 0.25 | 93.4 | 5.00 | 8.1 |
| 9 | 0.50 | 93.3 | 5.06 | 8.0 |
| 10 | 1.0 | 93.4 | 4.75 | 7.6 |
| 11 | 3.0 | 93.5 | 4.98 | 7.3 |

Indexable insert cutting edge lifetimes in the high speed roughing of AISI 1045 steel are shown in Table 6.

TABLE 6

TURNING AISI 1045 STEEL (197-199 BHN)

| Insert Material | Cutting Edge Life & Failure Mode | | Average Life (Minutes) |
|---|---|---|---|
| Mix 7 | 19 bk | 5 ch/bk | 12 |
| 8 | 12.6 dn/ch | 1 bk | 6.8 |
| 9 | 12.3 dn | 14.1 dn | 13.2 |
| 10 | 9.7 bk | 7.1 dn | 8.4 |
| 11 | 7.0 bk | 6.8 dn | 6.9 |

The test procedures and conditions and cutting edge life criteria used to generate the data shown in Tables 5 and 6 were the same as that described for Tables 2 and 3.

In another example in accordance with the present invention, a composition containing $Al_2O_3$—2.5 v/o $SiC_w$—10v/o $ZrO_2$—1.05 v/o MgO was made. A fifty gram batch of this composition was prepared by first blending an $Al_2O_3$ (Ceralax Grade HPA-0.5 with MgO (0.05 w/o)), $ZrO_2$ (Magnesium Elektron SC15) and MgO (Fisher Reagent Grade) slurry (propanol) in a jar mill using $Al_2O_3$ cycloids for one hour. A Sonicated $SiC_w$ (Tokai Grade 1) slurry was then added and the whole mix was blended for one hour. The $Al_2O_3$ and $ZrO_2$ containing slurries had previously been milled to obtain mean particle size of about 0.5–0.7 μm and 0.5 to 0.6 μm, respectively. Then the mix was pan dried, screened through a 100 mesh screen and isostatically compacted at 30,000 psi at room temperature. Pieces were then cut from the resulting cold compacted blank and sintered at 1700 degrees Centigrade for one hour in one atmosphere argon followed by hot isostatic pressing at 1600 degrees Centigrade for one hour in 17,000 psi argon. The resulting samples were greater than 99 percent dense (i.e., fully dense). As described in the prior examples, samples were then prepared for physical and mechanical testing and ground into indexable cutting inserts. It was determined that the samples contained about 6.6 v/o tetragonal zirconia. It is estimated that material processed in this manner has a zirconia particle size of about 5 μm or less. Cutting inserts of the style described in Table 3 were tested under the conditions used in Table 3. Cutting edge life times of 14.4 (DN failure) and 18.9 (FW & CH failure) minutes were obtained.

It is believed that cutting edge lifetime may be extended or made more uniform if the cutting edge is honed and/or the insert surface is lapped or polished to remove surface material containing a higher percentage of monoclinic and a lower percentage of tetragonal zirconia than is characteristic of the bulk of the material (i.e., a polished surface). It is known that grinding stresses create a surface layer in which a portion of the metastable tetragonal zirconia has been transformed to monoclinic zirconia. It is preferred that at least those surface areas of the insert which will encounter high temperatures during use have the maximum amount of tetragonal zirconia available for high temperature transformation.

All patents, patent applications and documents referred to herein are hereby incorporated by reference.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. An alumina based ceramic composition consisting essentially of:
   about 1.5 to 17.5 v/o silicon carbide whiskers;
   about 5 to 17.5 v/o zirconia;
   a residue of a magnesia addition added in the amount of about 0.03 to 3 v/o;
   alumina forming essentially the remainder of said composition;
   wherein said silicon carbide whiskers, said zirconia and said residue of said magnesia addition are substantially homogeneously dispersed in a matrix formed of said alumina; and
   wherein at least about 4.0 v/o of said ceramic composition is tetragonal zirconia.

2. The alumina based ceramic composition according to claim 1 wherein at least about 6.0 v/o of said composition is tetragonal zirconia.

3. The alumina based ceramic composition according to claim 2 wherein said silicon carbide whiskers are about 1.5 to 2.5 v/o.

4. The alumina based ceramic composition according to claim 1 wherein at least 7 v/o of said composition is tetragonal zirconia.

5. The alumina based ceramic composition according to claim 3 wherein said silicon carbide whiskers are about 1.5 to 2.5 v/o.

6. The alumina based ceramic composition according to claim 1 wherein said residue of said magnesia addition is about 0.03 to 2 v/o.

7. The alumina based ceramic composition according to claim 1 wherein said residue of said magnesia addition is about 0.04 to 1 v/o.

8. The alumina based ceramic composition according to claim 5 wherein said silicon carbide whiskers are about 1.5 to 2.5 v/o.

9. The alumina based ceramic composition according to claim 1 wherein said silicon carbide whiskers are about 2.5 to 15 v/o.

10. The alumina based ceramic composition according to claim 1 wherein said silicon carbide whiskers are about 2.5 to 10.5 v/o.

11. The alumina based ceramic composition according to claim 1 wherein zirconia is about 7.5 to 17.5 v/o.

12. The alumina based ceramic composition according to claim 1 wherein zirconia is about 10 to 15 v/o.

13. The alumina based ceramic composition according to claim 9 wherein said silicon carbide whiskers are about 1.5 to 2.5 v/o.

14. The alumina based ceramic composition according to claim 1 wherein said zirconia has an average particle size of less than 2 microns.

15. The alumina based ceramic composition according to claim 1 wherein said zirconia has an average particle size of less than or equal to one micron.

16. The alumina based ceramic composition according to claim 1 wherein said silicon carbide whiskers are about 1.5 to 2.5 v/o.

17. An article of manufacture comprising:
    an alumina based ceramic composition having a $K_{IC}$ (E&C) toughness of at least about $5MPam^{\frac{1}{2}}$;
    a Rockwell A hardness of at least 93 and a density of at least 98 percent of theoretical;
    said alumina based ceramic composition consisting essentially of:
    about 1.5-17.5 v/o silicon carbide whiskers;
    about 5 to 17.5 v/o $ZrO_2$;
    a residue of a magnesia addition added in an amount of about 0.03 to 3 v/o;
    an alumina based matrix wherein said silicon carbide whiskers, said zirconia and said residue of said magnesium oxide addition are substantially homogeneously distributed;
    and wherein tetragonal zirconia forms at least 4 v/o of said alumina based ceramic composition.

18. The alumina based ceramic composition according to claim 12 wherein said tetragonal zirconia is at least 6 v/o.

19. The alumina based ceramic composition according to claim 12 wherein said tetragonal zirconia is at least 7 v/o.

20. The alumina based ceramic composition according to claim 12 wherein said tetragonal zirconia is at least 8 v/o.

21. The alumina based ceramic composition according to claim 17 wherein said alumina based matrix is entirely alumina except for impurities.

22. The alumina based ceramic composition according to claim 17 wherein said zirconia has an average particle size no greater than 5 μm.

23. The alumina based ceramic composition according to claim 17 wherein said zirconia has an average particle size of less tan 2 μm.

24. An article of manufacture comprising:

an alumina based ceramic composition having a $K_{IC}$ (E&C) toughness of at least about 5MPam$^{\frac{1}{2}}$;
a Rockwell A hardness of at least 93 and a density of at least 98 percent of theoretical;
said alumina based ceramic composition consisting essentially of:
about 1.5-2.5 v/o silicon carbide whiskers;
about 5 to 17.5 v/o $ZrO_2$;
a residue of a magnesia addition added in an amount of about 0.03 to 3 v/o;
an alumina based matrix wherein said silicon carbide whiskers, said zirconia and said residue of said magnesium oxide addition are substantially homogeneously distributed;
and wherein tetragonal zirconia forms at least 4 v/o of said alumina based ceramic composition.

25. The alumina based ceramic composition according to claim 24 wherein said tetragonal zirconia is at least 6 v/o.

26. The alumina based ceramic composition according to claim 24 wherein said tetragonal zirconia is at least 7 v/o.

27. The alumina based ceramic composition according to claim 24 wherein said tetragonal zirconia is at least 8 v/o.

28. The alumina based ceramic composition according to claim 24 wherein said alumina based matrix is entirely alumina except for impurities.

* * * * *

UNITED STATES PATENT AND TRADEMARK OFFICE
CERTIFICATE OF CORRECTION

PATENT NO. : 4,965,231

Page 1 of 2

DATED : October 23, 1990

INVENTOR(S) : Pankaj K. Mehrotra; Elizabeth R. Billman

It is certified that error appears in the above—identified patent and that said Letters Patent is hereby corrected as shown below:

Title Page [73] Assignee: "Kennametal Inc., Latrode, Pa." should read
--- Kennametal Inc., Latrobe, Pa.---

Title Page [56] References Cited "4,543,345 9/1985 Wel et al. 501/95"
should read --- 4,543,345 9/1985 Wei et al. 501/95---

Title Page 2 Other Publications Column 2 '"'Phase Diagrams for Ceramists," Amer. Cer. Soc. (1975 Supp), pp. 117, 163E, 166." should read
--"Phase Diagrams for Ceramists," Amer. Cer. Soc. (1975 Supp), pp. 117, 163 & 166.---

Title Page 2 Other Publications Column 2 "Tien et al., "Toughened Ceramics in the System $Al_2O_3$: $Cr_2O_3 ZrO_2$: $HfO_2$" Int. J. High Tech. Ceramics 2 (1986), pp. 207-219."
should read ---Tien et al., "Toughened Ceramics in the System $Al_2O_3$: $Cr_2O_3/ZrO_2$: HfO," Int. J. High Tech. Ceramics 2 (1986), pp. 207-219.---

Column 3, line 39, "inVen-" should read ---inven- ---

Column 6, line 62, "1.603 m (111)" should read ---1.603 m ($\bar{1}$11)---

Column 6, line 64, "1.603 lm (111) + lt (111)" should read
---1.603 lm ($\bar{1}$11) + lt (111)---

UNITED STATES PATENT AND TRADEMARK OFFICE
CERTIFICATE OF CORRECTION

PATENT NO. : 4,965,231

DATED : October 23, 1990

INVENTOR(S) : Pankaj K. Mehrotra; Elizabeth R. Billman

It is certified that error appears in the above-identified patent and that said Letters Patent is hereby corrected as shown below:

Column 10, line 67, "tan" should read ---than---

Signed and Sealed this

Twenty-eighth Day of July, 1992

Attest:

DOUGLAS B. COMER

Attesting Officer     Acting Commissioner of Patents and Trademarks